(No Model.)

M. P. MIGHELL.
HARROW.

No. 262,456. Patented Aug. 8, 1882.

WITNESSES

INVENTOR,

Attorneys

UNITED STATES PATENT OFFICE.

MONTRAVILLE P. MIGHELL, OF WATERMAN STATION, ILLINOIS.

HARROW.

SPECIFICATION forming part of Letters Patent No. 262,456, dated August 8, 1882.

Application filed February 2, 1882. (No model.)

*To all whom it may concern:*

Be it known that I, MONTRAVILLE P. MIGHELL, of Waterman Station, in the county of De Kalb and State of Illinois, have invented certain new and useful Improvements in Harrows; and I do hereby declare that the following is a full, clear, and exact description of the invention, which will enable others skilled in the art to which it appertains to make and use the same, reference being had to the accompanying drawings, which form a part of this specification, and in which—

Figure 1:
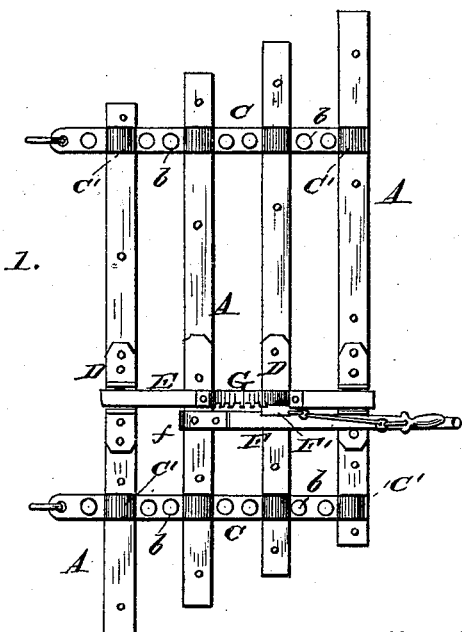
Figure 3:
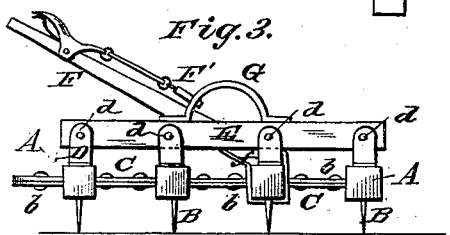
Figure 4:
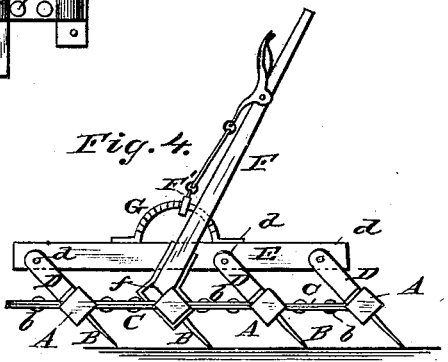
Figure 2:
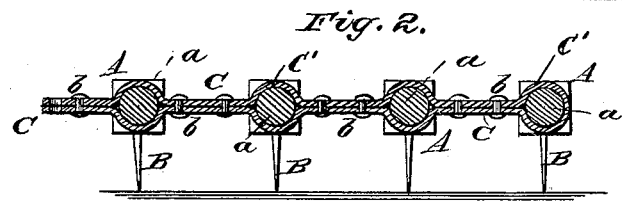
Figure 5:
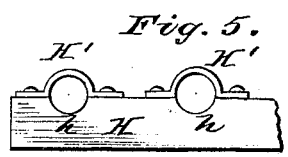
Figure 6:
Figure 7:

Figure 1 is a plan or top view of one of the sections of my improved harrow, all of the sections, of which there may be two or more, being constructed alike. Fig. 2 is a longitudinal section through one of the bands which connect the adjustable tooth-bars. Figs. 3 and 4 are side elevations, representing opposite sides of the harrow with the teeth in different positions; and Figs. 5, 6, and 7 represent modified constructions of the cross-bars which connect the parallel tooth-bars.

Similar letters of reference indicate corresponding parts in all the figures.

My invention relates to that class of harrows in which the tooth-bars are pivoted to admit of the adjustment of the teeth from a vertical to a slanting position, and vice versa; and it consists in the improvements hereinafter more fully described, and particularly pointed out in the claim.

The several sections which make up the complete harrow are all alike in construction and attached to a common drag-bar in a manner well understood. I have shown, therefore, only one of said sections, the description of which will apply to all.

A A are the tooth-bars, which are preferably of wood and provided with straight teeth B. The several bars A A are connected parallel to one another by bands of hoop or strap iron C, which are looped around the rounded or cylindrical parts *a a* of each bar, doubled around the last bar, and then passed back on the under side, the straight doubled part of the strap or band C between each of its loops C' being united by rivets *b b*, as will appear by reference to Fig. 2 of the drawings. If desired, however, a somewhat modified construction may be adopted for connecting the parallel tooth-bars. Thus, in Fig. 5 I have shown the bars connected by a transverse wooden beam or bar, H, having semicircular recesses *h* to receive the rounded parts *a* of the tooth-bars, which are covered by metal caps H' H'. In Fig. 6 the construction is the same, with the difference only that the cap H' consists of a single piece made with two loops or bends, one for each of the boxes or recesses in the bar. In Fig. 7 the part of the doubled connecting-strap C between each loop C' is spaced by a wooden block, *c*, through which the rivets *b b* are passed. In each case it will be seen that boxes are formed for the rounded parts *a* of the tooth-bars, so that the latter may turn freely.

Upon each of the tooth-bars A is bolted an elbow or angle-iron, D, the several elbows being in a line with one another, and their upright arms pivoted by bolts *d* to a cross-bar, E.

To one of the tooth-bars A is secured rigidly, by a casting, *f*, a lever, F, which is provided with a detent or spring-pawl, F', adapted to engage with a segmental rack, G, secured upon the cross-bar E.

From the foregoing description, taken in connection with the drawings, the operation and advantages of my improved harrow will readily be understood. By raising the lever F it can be changed instantly from a "straight-tooth" to a "slanting-tooth" harrow without stopping the team.

It often occurs that different kinds of soil are found in the same field, requiring different "setting" of the harrow-teeth. When the soil is soft a harrow with straight or vertical teeth will run too deep. By tilting the tooth-bars in the manner described any depth of run can be procured, and if the harrow fills with rubbish it can be cleaned in an instant by slanting the teeth, which, after clearing, can be reset into their former position by the lever without stopping the team.

Having thus described my invention, I do not claim broadly a harrow having pivoted tooth-bars and means for adjusting the same and holding them in their adjusted position; but

What I claim as my improvement, and de- sire to secure by Letters Patent of the United States, is—

The connecting-bars C, doubled to form loops or boxes C', and riveted at b b between said boxes, in combination with the tooth-bars A, having cylindrical parts a, substantially as and for the purpose herein shown and described.

In testimony that I claim the foregoing as my own I have hereunto affixed my signature in presence of two witnesses.

MONTRAVILLE PIERCE MIGHELL.

Witnesses:
GEORGE W. PLACE,
WILLIAM WHEELER.